United States Patent [19]

Ericson

[11] 4,202,027
[45] May 6, 1980

[54] CIRCUIT BREAKER DRAWOUT WITH ENGAGED POSITION LATCH

[75] Inventor: Eric A. Ericson, Plainville, Conn.

[73] Assignee: General Electric Company, New York, N.Y.

[21] Appl. No.: 955,432

[22] Filed: Oct. 27, 1978

[51] Int. Cl.² ............................................. H02B 1/04
[52] U.S. Cl. .............................. 361/338; 200/50 AA; 200/322; 200/153 V
[58] Field of Search ............... 361/335, 338, 339, 343; 200/50 R, 50 AA, 318, 321, 322, 323, 324, 153 V

[56] References Cited

U.S. PATENT DOCUMENTS

| | | | |
|---|---|---|---|
| 3,663,773 | 5/1972 | Powell | 361/339 |
| 4,004,113 | 1/1977 | Ericson | 200/50 AA |
| 4,012,610 | 3/1977 | Ericson | 200/50 AA |

Primary Examiner—Gerald P. Tolin
Attorney, Agent, or Firm—Robert A. Cahill; Walter C. Bernkopf; Philip L. Schlamp

[57] ABSTRACT

Drawout apparatus includes a carriage mounting a circuit breaker and supported on rails to facilitate racking screw induced movement of the breaker into and out of an electrically engaged position with respect to switchboard primary disconnect contacts. A carriage mounted latch lever is controllably positioned in response to the turning of the racking screw so as to latchably engage a switchboard mounted latch as the circuit breaker arrives at its engaged position, thereby assisting in holding the breaker thereat against blowout forces attending a high fault current interruption. Initial rotation of the racking screw to withdraw the breaker from its engaged position incidentally disengages the latch lever and latch.

7 Claims, 9 Drawing Figures

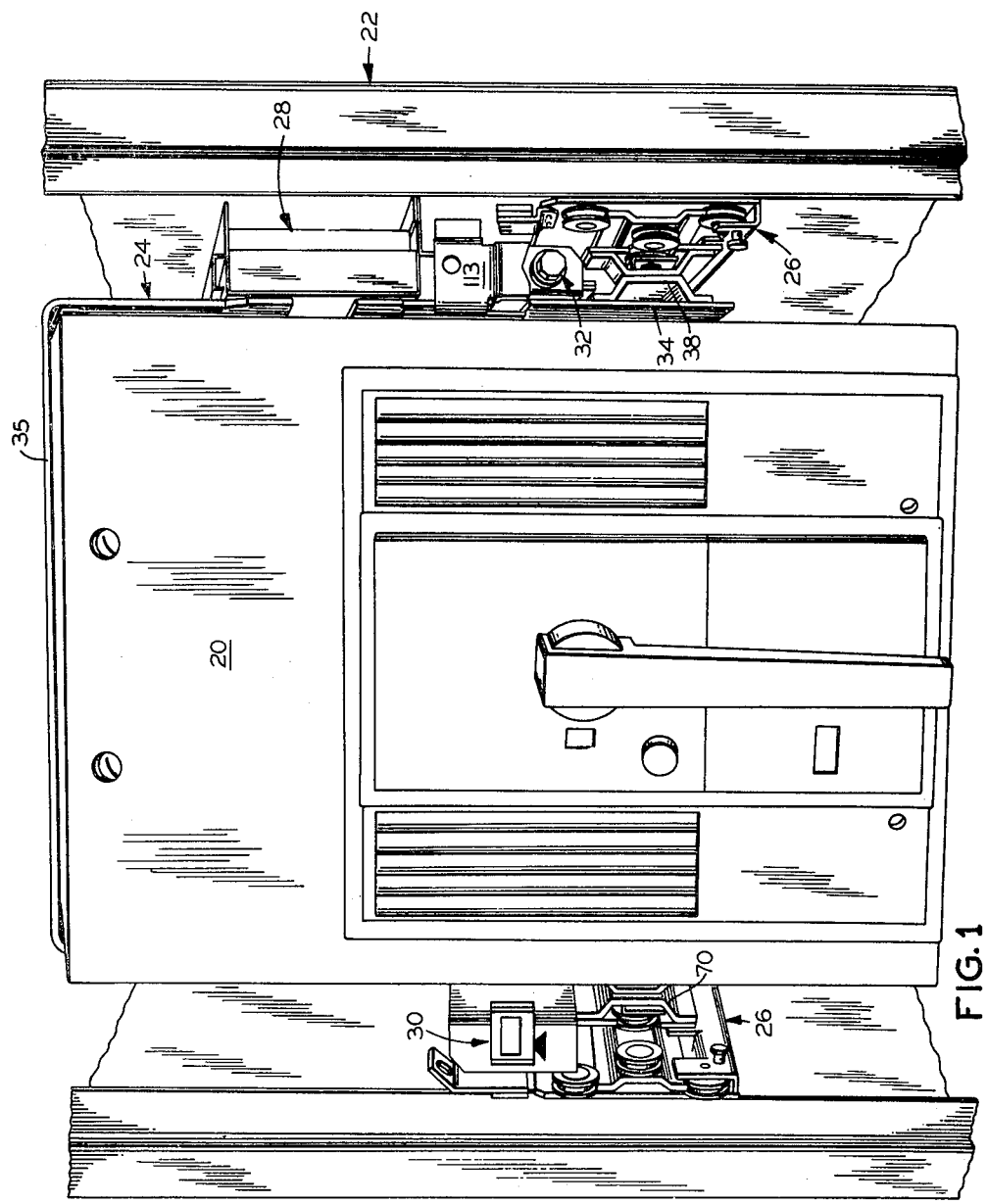

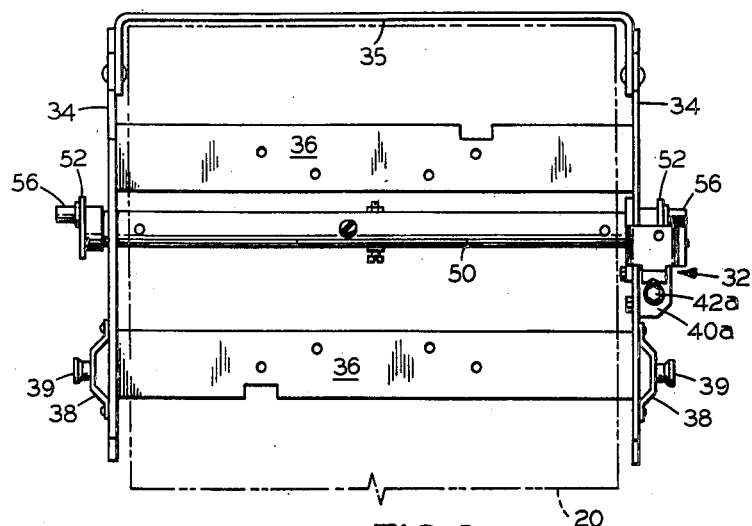
FIG. 5
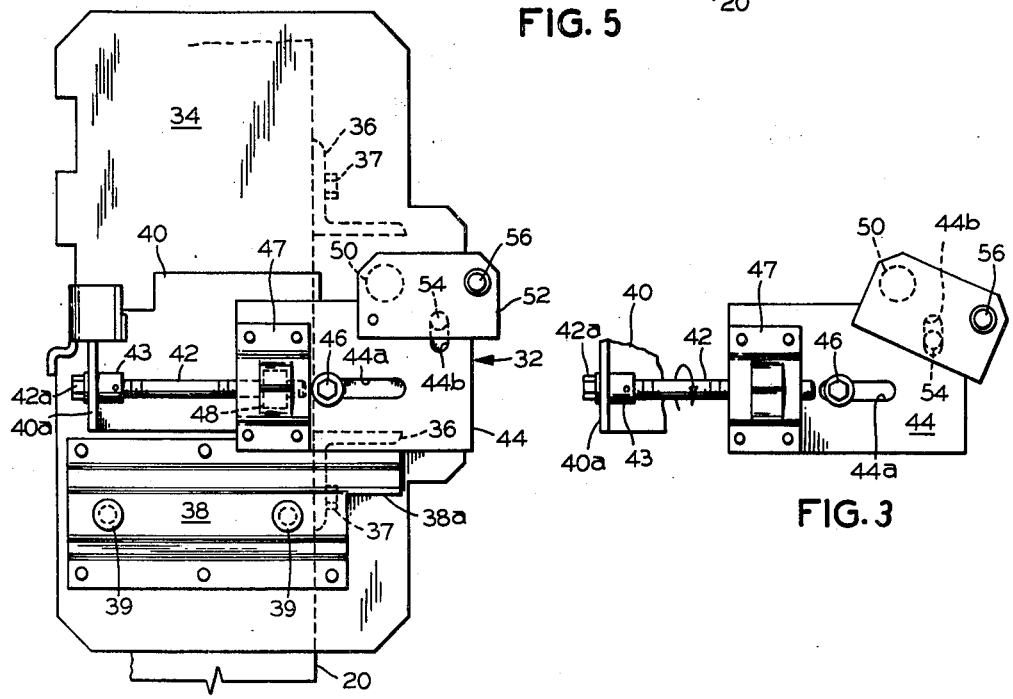
FIG. 2
FIG. 3
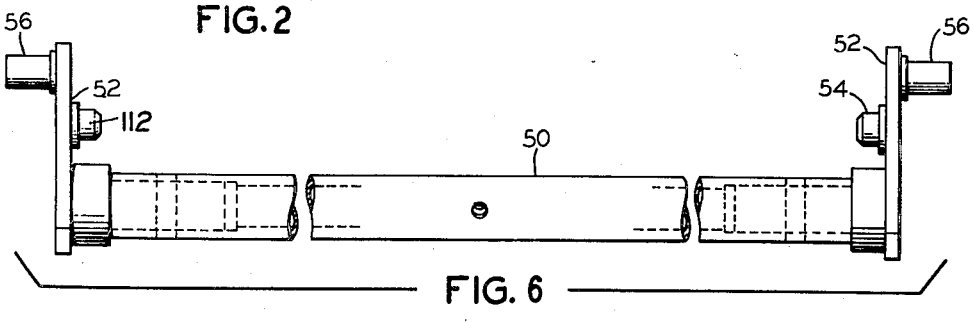
FIG. 6

CIRCUIT BREAKER DRAWOUT WITH ENGAGED POSITION LATCH

BACKGROUND OF THE INVENTION

The present invention relates to improved circuit breaker drawout apparatus for electrical switchboards and particularly to drawout apparatus capable of withstanding extreme blowout forces developed during high fault current interruptions by the breaker.

Commonly assigned U.S. Pat. No. 4,004,113 discloses circuit breaker drawout apparatus for electrical switchboards wherein a circuit breaker is mounted by a carriage which, in turn, is supported on telescoping rails for movement between extended and engaged positions through intermediate, disengaged and test positions. For movement into and out of the engaged position during which rather sizable contact pressures of the switchboard primary disconnect contacts must be contended with, the mechanical advantage afforded by a racking mechanism is utilized. This racking mechanism includes a racking lead screw rotatably mounted to one side of the carriage for translating a travelling nut drivingly connected to swing a crank through a predetermined arc. This crank carries a crank pin which moves through an elongated cam slot provided in a switchboard mounted cam plate fixedly mounted to one side of the switchboard cubicle pursuant to camming the circuit breaker into and out of its engaged position. To ensure non-skewed racking movement of the circuit breaker, the crank drivingly connected with the travelling nut is mounted on one end of a crank shaft journaled by the carriage and extending transversely behind the breaker to the other side of the carriage. A second crank is mounted on this other end of the crank shaft and carries a crank pin operating in an indentically configured cam slot provided in a second cam plate mounted to the other side of the switchboard cubicle. Thus, the two cranks swing in unison to develop substantially equal camming forces at each side of the carriage for evenly racking the circuit breaker into and out of its engaged position.

It has been discovered that the electromotive forces produced by high fault currents flowing through the breaker, coupled with the gaseous high pressure exhaust emanating from the breaker while interrupting such currents, develops blowout forces of greater than anticipated magnitudes acting in a direction to drive the breaker away from its engaged position. Since the primary disconnect contact pressures have very little holding power in opposition to such blowout forces, the drawout apparatus must absorb the brunt if the breaker engaged position is to be sustained. Obviously, separation of the primary contacts while high fault currents are flowing therethrough produces violent arcing which, at the very least, will destroy the breaker and switchboard disconnect contacts.

It is accordingly an object of the present invention to provide improved circuit breaker drawout apparatus capable of withstanding the tremendous blowout forces attending a high fault current interruption.

An additional object is to provide drawout apparatus of the above character wherein the circuit breaker is positively latched in its engaged position.

A further object is to provide drawout apparatus of the above character wherein the circuit breaker is latched in its engaged position incident with racking of the breaker thereto and is unlatched incident with racking of the breaker therefrom.

Another object is to provide drawout apparatus of the above character wherein the engaged position latching provision is implemented in a simple, practical and effective manner and is convenient to operate.

Other objects of the invention will in part be obvious and in part appear hereinafter.

SUMMARY OF THE INVENTION

In accordance with the present invention, there is provided improved circuit breaker drawout apparatus capable of fully absorbing the "blowout" forces attending a high fault current interruption, thus sustaining the breaker in its engaged position with respect to switchboard primary disconnect contacts in opposition to such blowout forces. To this end, the drawout apparatus includes a carriage mounting a circuit breaker and in turn supported on rails facilitating carriage movement between an extended position and an engaged position with respect to switchboard primary disconnect contacts through intermediate disengaged and test positions. The carriage also rotatably mounts along one side a racking lead screw adapted to drive a travelling nut, in turn, drivingly connected to a first crank. A carriage mounted transverse crank shaft mounts at one end this first crank and a second identical crank at its other end. Each crank carries a crank pin which operates in an elongated cam slot formed in separate cam plates individually fixably mounted to the switchboard at each side of a switchboard cubicle accommodating the drawout apparatus. Upon driving rotation of the lead screw, the two cranks are uniformly swung in an arc to move their crank pins through these cam slots pursuant to camming or racking the circuit breaker between its test and engaged positions.

In accordance with the improvement afforded by the present invention, the carriage pivotally mounts a latch lever which is controllably positioned by an actuating pin carried by the second crank to engage a switchboard mounted latch as the circuit breaker is racked into its engaged position and to disengage the latch incident with initial racking movement away from the engaged position. The positive engagement of the latch and latch lever has been found to more than adequately assist the drawout apparatus in successfully sustaining the engaged breaker position in the face of the tremendous blowout forces attending a high fault current interruption.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a better understanding of the nature and objects of the invention, reference should be had to the following detailed description taken in connection with the accompanying drawings, in which:

FIG. 1 is a front perspective view of a circuit breaker mounted in a switchboard cubicle by drawout apparatus embodying the present invention;

FIG. 2 is a side elevational view of a circuit breaker mounting carriage utilized in the drawout apparatus of FIG. 1;

FIG. 3 is a fragmentary view of a portion of FIG. 2 illustrating the action of a racking mechanism utilized in the drawout apparatus of FIG. 1;

FIG. 5 is a front elevational view of the circuit breaker mounting carriage of FIG. 2;

FIG. 6 is an enlarged side view of a crank shaft utilized in the racking mechanism of FIGS. 2 and 3;

Corresponding reference numerals refer to like parts through the several views of the drawing.

DETAILED DESCRIPTION

Figure 4:
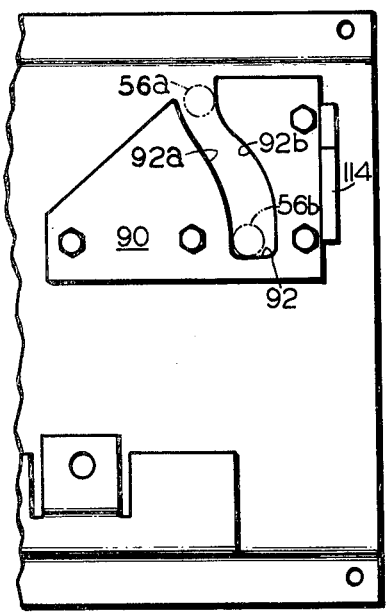
FIG. 4 is a fragmentary, somewhat diagrammatic view illustrating the camming action achieved by the racking mechanism of FIGS. 2 and 3 in racking the circuit breaker into and out of its engaged position.

Referring to FIG. 1, the invention is embodied in drawout apparatus for facilitating racking movement of a large, industrial-type circuit breaker 20 into and out of a cubicle or compartment of an electrical enclosure or switchboard 22. The circuit breaker is mounted by a carriage, generally indicated at 24, which in turn is supported for racking movement by opposed telescoping rail assemblies, generally indicated at 26 and mounted by the switchboard to each side of the cubicle. The rail assemblies accommodate racking movement of the circuit breaker between a fully withdrawn or extended position to a retracted or engaged position wherein the breaker-switchboard load current carrying primary disconnect contacts (not shown) are engaged. Intermediate these two extreme positions, there is a "test" circuit breaker position wherein the primary contacts are disengaged, but circuit breaker-switchboard secondary contacts, generally indicated at 28, remain engaged for operational testing of the various accessorial or auxiliary functions embodied in the circuit breaker. Intermediate the extended and the test position is a so-called "disengaged" position wherein both the primary and secondary contacts are disengaged. These various breaker positions are identified by a position indicator, generally indicated at 30. Racking movement of the circuit breaker between its extended and test positions is readily effected manually through the convenience of the rail assemblies. However, due to the extreme contact pressure built into the primary disconnect contacts required for cool running joints at high current ratings, racking movement between the test and engaged positions is effected by operation of a racking mechanism, generally indicated at 32. For a more detailed description of drawout apparatus of the type thus far described, reference may be had to the above-noted U.S. Pat. No. 4,004,113, whose disclosure is specifically incorporated herein by reference.

Turning to FIG. 2, carriage 24 consists of a pair of spaced sideplates 34 rigidly interconnected across the top by a tie strap 35 and across the back by a pair of stringers 36, as best seen in FIG. 5. Bolts 37 threaded into the base of circuit breaker 20 clamp the stringers to the circuit breaker case and affix the circuit breaker to the carriage. A horizontally elongated bracket 38 is affixed to each sideplate for the purpose of mounting front and rear carriage support pins 39. These pins are received in slots provided in the inner rails of each rail assembly 26 in the manner disclosed in the above-noted patent, pursuant to mounting the circuit breaker-carriage assembly thereon. A mounting plate 40, affixed to the right carriage sideplate 34, is formed with a turned-out front flange 40a which rotatably mounts a racking lead screw 42 included in racking mechanism 32. A collar 43 fitted on lead screw 42 cooperates with the lead screw head 42a to prevent axial movement thereof. A slideplate 44 is provided with a horizontally elongated slot 44a through which a bolt 46 extends; the end of this bolt being threaded into the adjacent carriage sideplate. A bracket 47 is affixed to slideplate 44 and captures a travelling nut 48 through which lead screw 42 is threaded. It is thus seen that slideplate 44 is free to reciprocate horizontally as the lead screw is rotated in opposite directions via a suitable tool, for example, a conventional socket wrench.

Racking mechanism 32 further includes a crank shaft 50, best seen in FIGS. 5 and 6, extending across the back of the circuit breaker and journaled adjacent its ends in carriage sideplates 34. Affixed to each end of this shaft beyond the sideplates is a crank arm 52. The right crank arm carries an inwardly extending pin 54 which is received in a vertically elongated slot 44b in slideplate 44 (FIGS. 2 and 3). It is thus seen that reciprocation of slideplate 44 by lead screw 42 swings the right crank arm 52 through an arc via pin 54, and likewise the left crank arm via interconnecting crank shaft 50. The crank arms mount outwardly extending crank pins 56 which move through respective double-acting cam slots 92 formed in a cam plate 90, seen in FIG. 4, which are mounted to the switchboard to each side of the compartment accommodating the drawout apparatus. These crank pins 56 act on the forward edges 92a of the cam slots to draw the circuit breaker from the test position inwardly to the engaged position and act on the rearward edges 92b thereof to push the circuit breaker back from the engaged position to the test position. This action is implemented by rotation of racking mechanism lead screw 42 in one direction to swing the crank pins downwardly in slots 92 and draw the circuit breaker into the engaged position and by rotation of the racking screw in the opposite direction to swing the crank pins upwardly in their cam slots to back the circuit breaker off to the test position.

Figure 7:
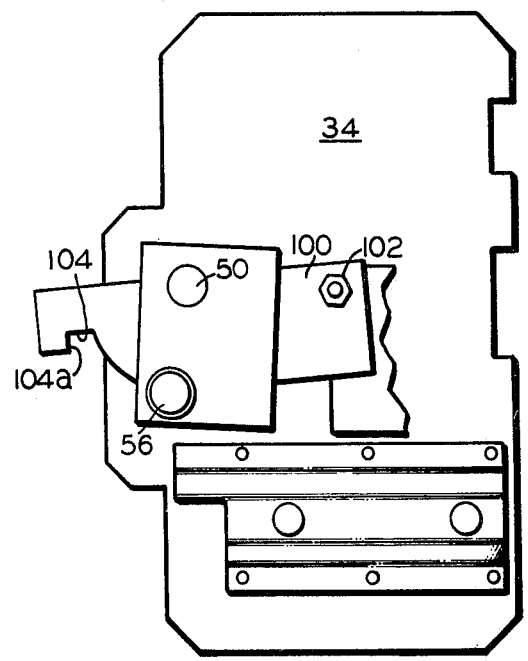
FIG. 7 is an elevational view of the other side of the carriage seen in FIG. 2.
Figure 8:
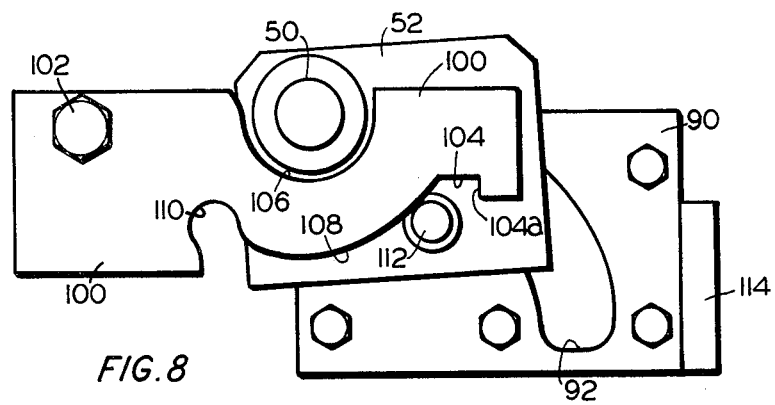
FIG. 8 is a fragmentary side elevational view of a latching mechanism utilized in the drawout apparatus of FIG. 1 and as seen in its unlatching condition.
Figure 9:
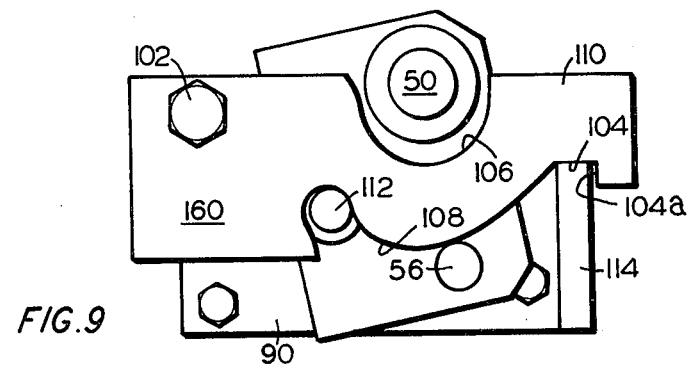
FIG. 9 is a fragmentary side elevational view showing the latching mechanism in its latched condition.

In accordance with the improvement afforded by the present invention, a latch lever 100 is pivotally mounted adjacent its forward end on a pivot post 102 affixed to the left carriage sideplate 34, as seen in FIG. 7. This latch lever extends rearwardly between crank arm 52 and the carriage sideplate with a notch 104 machined in its lower edge adjacent the rearward termination thereof. As seen in FIGS. 8 and 9, the upper edge of latch lever 100 is relieved at 106 so as to avoid interference with crank shaft 50. Extending forwardly from notch 104, the lower edge of latch lever 100 is provided with an arcuate latch control surface 108 terminating in a notch 110. Acting on this cam control surface is a pin 112 carried by the left crank arm 152, as also seen in FIG. 6. Notch 104 at the rearward end of latch lever 100 is provided with a straight-sided latching shoulder 104a which is controllably positioned into latching engagement with a laterally extending latch bar 114 mounted by the switchboard just beyond the rearward edge of latch plate 90 when the circuit breaker assumes its engaged position.

From FIG. 8, it is seen that while the circuit breaker is in its test position, pin 112 engages the arcuate surface 108 of latch lever 100 so as to maintain this latch lever in an elevated position with its nose portion maintained at a position above the level of the upper edge of latch 114. At this time, the crank pins are in the phantom line position 56a seen in FIG. 4 relative to their respective cam slots 92. Upon rotation of the racking mechanism lead screw 42 in a direction to rack the circuit breaker into its engaged position, crank arms 52 are swung downwardly, propelling their crank pins 56 downwardly through cam slots 92 in cam plates 90. Incident with this motion of the crank arms, latch control pin 112 carried by the left crank arm moves forwardly along the latch control surface 108, all the while maintaining latch lever 100 in its elevated position. Upon arrival of the circuit breaker in its engaged position, latch control pin 112 reaches the forward end of latch control surface 108. With the final several turns of racking lead screw 42, the concluding increment of counterclockwise rotation of the crank arms 52 causes latch control pin 112 to move into notch 110. As a consequence, the rearward end of latch lever 100 is permitted to drop downwardly into a latching position with its latch shoulder 104a in latching engagement with latch bar 114, as seen in FIG. 9. The abrupt transition from control surface 108 to notch 110 for control pin 112 enables latch lever 100 to abruptly drop into its latching position coincident with the concluding several turns of lead screw 42.

With the breaker latched in its engaged position, crank pins 56 will have assumed the phantom line position 56b seen in FIG. 4 engaging the forward edges 92a of their respective cam slots 92 adjacent the bottoms thereof. When the racking screw is rotated in the opposite direction, crank arms 52 are swung upwardly, propelling their crank pins 56 upwardly in their respective cam slots. During the initial increment of this motion, the crank pins swing from engagement with their cam slot forward edges 92a into engagement with their cam slot rearward edges 92b. As seen in FIG. 4, the width of each cam slot 92 is greater than the diameter of the crank pin operating therein, and consequently there is provided a degree of lost motion between the racking screw and the carriage incident with a reversal in racking screw rotation. In racking the circuit breaker away from its engaged and latched position, this lost motion advantageously enables control pin 112 to move out of notch 110 and onto control surface 108, thereby lifting latch lever 100 out of latching engagement with latch bar 114 before the crank pins move into engagement with their rearward cam slot edges to begin such racking movement. Consequently, mechanical interference between the racking mechanism and the latching mechanism is avoided in a simple and efficient manner.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A drawout apparatus for racking a circuit breaker into and out of an engaged position with respect to load current carrying primary disconnect contacts of a switchboard, said apparatus comprising, in combination:
    A. a carriage mounting the circuit breaker;
    B. opposed rail assemblies mounted by the switchboard to each side of a switchboard cubicle and supporting said carriage for racking movement into and out of the circuit breaker engaged position;
    C. a manually operated racking mechanism mechanically assisting racking movement of the circuit breaker into and out of its engaged position, said racking mechanism including coacting camming means separately mounted by said carriage and the switchboard; and
    D. a latching mechanism including
        (1) a first latch member mounted by one of said carriage and switchboard for movement between latching and nonlatching positions,
        (2) a second latch member fixedly mounted to the other of said carriage and switchboard, and
        (3) means carried by said camming means for controllably positioning said first latch member to its latching position in latching engagement with said second latch member incident with operation of said racking mechanism in racking the circuit breaker fully into its engaged position and controllably positioning said first latch member to its non-latching position removed from latching engagement with said second latch member incident with initial operation of said racking mechanism preparatory to racking the circuit breaker out of its engaged position.

2. The drawout apparatus defined in claim 1, wherein said first latch member is in the form of a lever pivotally mounted by said carriage and said second latch member is in the form of a latch bar fixedly mounted to the switchboard.

3. The drawout apparatus defined in claim 2, wherein said racking mechanism includes
    (1) a racking lead screw rotatably mounted to one side of said carriage,
    (2) a travelling nut threaded on said lead screw,
    (3) a transverse crankshaft journaled by said carriage,
    (4) a first crank affixed to one end of said crankshaft and drivingly coupled with said travelling nut,
    (5) a second crank affixed to the other end of said crankshaft,
    (6) a separate cam plate mounted to the switchboard at each side of the cubicle, each said cam plate formed having an elongated cam slot therein, and
    (7) a crank pin carried by each said crank for respective operation in each said cam slot, whereby rotation of said lead screw propels said crank pins in unison through their respective cam slots pursuant to racking the circuit breaker into and out of its engaged position.

4. The drawout apparatus defined in claim 3, wherein said means controllably pivoting said latch lever is a latch control pin carried by said second crank.

5. The drawout apparatus defined in claim 4, wherein said crank pins operate against corresponding forward edges of their associated cam slots pursuant to camming the circuit breaker into its engaged position and against corresponding rearward edges of their associated cam slots pursuant to camming the circuit breaker out of its engaged position, the separation between said forward and rearward edges of said cam slots affording a limited degree of lost motion during initial operation of said racking mechanism while said crank pins move from operation against their corresponding forward cam slot edges into operation against their corresponding rearward cam slot edges preparatory to racking the circuit breaker out of its engaged position, said latch control pin pivoting said latch lever out of latching engagement with said latch bar while said crank pins are involved in their lost motion movement between said forward and rearward edges of their associated cam slots.

6. The drawout apparatus defined in claim 5, wherein said latch lever includes a latch bar engaging notch formed in the bottom edge thereof adjacent its inward end, and a latch control surface formed in said bottom edge having an arcuate segment extending forwardly from said latch engaging notch and abruptly terminating in a latch actuating notch, said control pin bears against said arcuate segment to hold said latch lever in a non-latching position while the breaker is removed from its engaged position and, upon arrival of the breaker in its engaged position, said control pin rides into said latch actuating notch thereby enabling said latch lever to swing its latch engaging notch downwardly into latching engagement with said latch bar.

7. The drawout apparatus defined in claim 6, wherein said control pin moves out of said latch actuating notch onto said arcuate segment while said crank pins are involved in their lost motion movement between said forward and rearward edges of their associated cam slots.

* * * * *